G. C. JONES.
AUTOMATICALLY SWINGING HEADLIGHT.
APPLICATION FILED MAY 17, 1916.
1,219,947.
Patented Mar. 20, 1917.
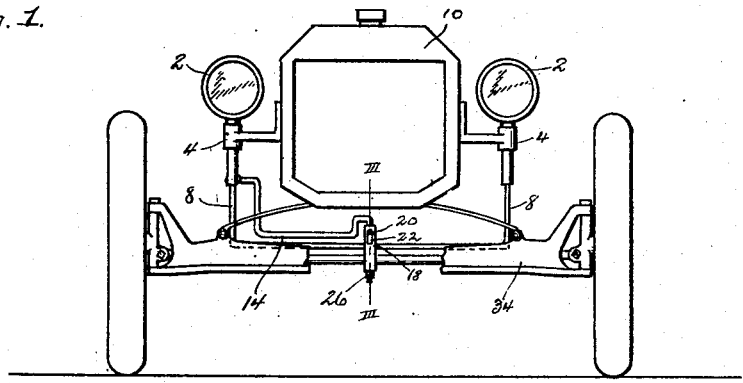
Fig. 1.
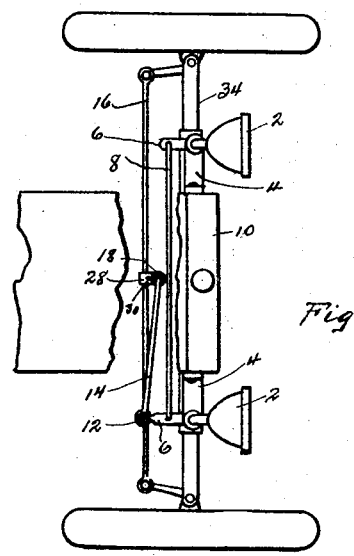
Fig. 2.
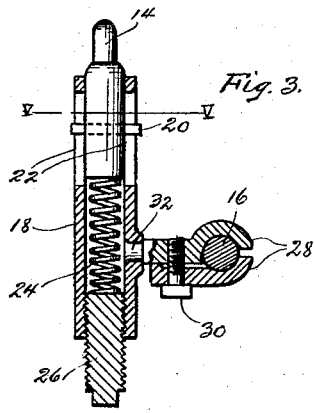
Fig. 3.
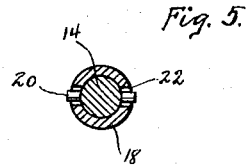
Fig. 4.
Fig. 5.
WITNESS:
R. Hamilton
INVENTOR:
Geo. C. Jones,
BY
Chas. W. Gerard,
his ATTORNEY.

UNITED STATES PATENT OFFICE.

GEORGE C. JONES, OF KANSAS CITY, KANSAS.

AUTOMATICALLY-SWINGING HEADLIGHT.

1,219,947.  Specification of Letters Patent.  Patented Mar. 20, 1917.

Application filed May 17, 1916. Serial No. 98,073.

*To all whom it may concern:*

Be it known that I, GEORGE C. JONES, a citizen of the United States, residing at Kansas City, in the county of Wyandotte and State of Kansas, have invented certain new and useful Improvements in Automatically-Swinging Headlights, of which the following is a full and exact specification.

The present invention relates to head-light constructions, and particularly to the head-light systems of motor-driven vehicles, the primary object in view being to devise an improved construction and arrangement whereby the head-light lamps will be swung in accordance with the turning movements of the vehicle. To this end, swinging lamps are provided and arranged with connections to the steering rod of the vehicle for moving said lamps in unison in accordance with the movements of the steering rod, and said connections are further provided with means permitting such relative movements of the parts as are proper for accommodating the relative play between the axle and vehicle body. It is also an object to devise a system of connections which will be adaptable for any ordinary form of chassis and body construction and steering rod arrangement.

With the foregoing general object in view, together with such minor objects as will appear in the course of the detail description, the invention will now be described with reference to the accompanying drawing illustrating one form of embodiment of the improvements, after which those features and combinations deemed to be novel will be set forth and defined in the appended claim.

In the drawing—

Figure 1 is an elevation of the front end of a car provided with the present improvements, with portions of the car broken away;

Fig. 2 is a plan view of the same;

Fig. 3 is a section on the line III—III of Fig. 1, taken on a larger scale;

Fig. 4 is an enlarged detail of a connection to one of the lamp-swinging arms; and Fig. 5 is a transverse section, taken on the line V—V of Fig. 3.

Referring to the drawing in detail, the same illustrates the head-light lamps 2 of a motor car as pivotally mounted about vertical axes within the brackets 4, and each lamp is provided with a horizontal rearwardly extending operating arm 6, these arms being connected for movement in unison by the rod 8 which is pivoted at its opposite ends to said arms and is of whatever contour may be necessary for traversing the space between the arms 6 without interfering with any of the various parts beneath the radiator 10 or engine associated therewith. To one of the arms 6 is connected, by a ball and socket or equivalent joint 12, the link rod 14 which is also of suitable outline or contour for spanning the space between said arm and the midpoint of the reach or steering rod 16. At this point connection is made by a tubular member 18 (see Fig. 3) within which the adjacent end of the link rod 14 extends for vertical sliding or telescoping movement, said rod being provided with a guide pin 20 riding in the guide slots 22 formed in the tubular member 18. The inner end of the rod 14 is yieldingly supported by means of the coil spring 24, which latter is supported within said tubular member 18 by the adjustable plug 26 screw-fitted within the lower end of the member 18. The said member 18 is in turn joined by a horizontal pivotal connection to the steering rod 16, said connection comprising the clamping plates 28 which are clamped by means of the screw 30 to said rod 16, one of said plates being formed with the horizontal trunnion projection 32 acting as the pivotal support for said tubular member 18.

While the connection with the steering rod 16 is illustrated as made at the rear of the axle 34 of the car, it will of course be understood that this connection may readily be made at the front of said axle in case the rod 16 be so located, or in whatever relation may be necessary for accommodating these various positions of the steering rod.

It will thus be apparent that a simple and efficient arrangement and construction have been provided for carrying out the objects of the invention, all the steering movements of the rod 16 acting through the described connections to impart turning movements to the lamps, in accordance with the turning movements of the vehicle, so that the light from the lamps will always be cast in the direction in which the vehicle is moving. The telescoping connection between the rods 14 and 16, as well as the ball and socket joint 12 and pivotal connection 32, provide for the relative approaching and separating movements of the axle and vehicle body, so that these movements are accommodated without affecting the operative movements of the lamp-swinging mechanism, the pivotal connection 32 further accommodating any endwise rocking of the steering rod 16.

Claim:

In an automatically swinging head-light construction for motor vehicles, the combination with the steering rod, of lamps each mounted for movement about a vertical axis, and connections between said rod and lamps whereby endwise movement of the rod will move said lamps in unison about said axes, said connections including an arm rigid with one of the lamps for swinging the same, a member having a ball and socket connection at one of its ends with said arm, the other end of said member being turned downwardly and provided with a tubular member mounted slidingly thereon, said tubular member being provided with a horizontal pivotal connection to said steering rod, and an adjustable spring element carried within said tubular member in position for yieldingly supporting said down-turned end of said first member.

G. C. JONES.

Copies of this patent may be obtained for five cents each, by addressing the "Commissioner of Patents, Washington, D. C."